June 12, 1928.
H. E. HAWKINS
LUBRICANT COMPRESSOR
Filed April 10, 1922
1,672,980
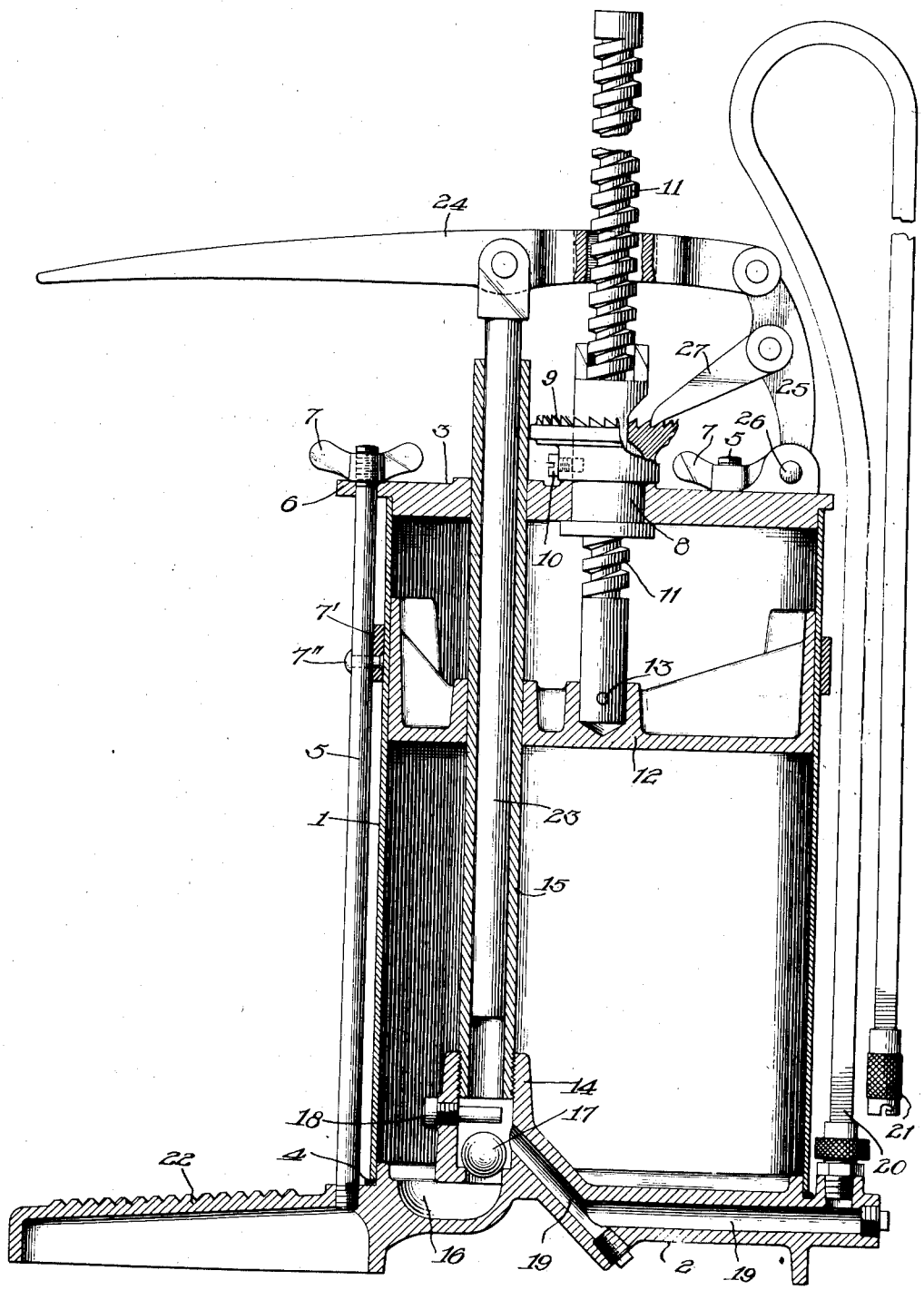

Patented June 12, 1928.

1,672,980

UNITED STATES PATENT OFFICE.

HARRY E. HAWKINS, OF SAN FRANCISCO, CALIFORNIA, ASSIGNOR TO THE BASSICK MANUFACTURING COMPANY, OF CHICAGO, ILLINOIS, A CORPORATION OF DELAWARE.

LUBRICANT COMPRESSOR.

Application filed April 10, 1922. Serial No. 551,181.

My invention relates to improvements in lubricant compressors, and is particularly concerned with the provision of a compressor adapted to form a part of a high pressure lubricating system.

The objects of my invention are

First: to provide a compressor of the character described, by means of which the operator can deliver a large quantity of lubricant under high pressure in a comparatively short period of time;

Second: to provide a compressor of the character described, which can be operated with comparatively little effort;

Third: to provide a lubricant compressor comprising a low pressure cylinder and a high pressure cylinder, each having a lubricant expelling member operating therein, and means for alternately actuating said lubricant expelling members;

Fourth: to provide a lubricant compressor such as described, in which both lubricant expelling members are actuated by a common means, and Fifth: to provide a compressor of the character described, which is simple in construction, rugged, and economical to manufacture.

Other objects will appear as this description progresses, reference being had to the accompanying drawing in which I have shown my improved compressor in central vertical section.

The embodiment of my invention illustrated herein comprises a low pressure cylinder 1, which is preferably circular in cross-section. The lower end of the cylinder 1 is closed by the base plate 2, and the upper end is closed by a removable closure 3. The joint between the lower end of the cylinder 1 and the base plate 2 is sealed by means of the gasket 4. The cylinder 1, the base plate 2, and the closure 3 are held in assembled relation by means of the rods 5, the lower ends of which are threaded into the base plate 2 and the upper ends of which project through suitably apertured lugs 6, projecting from the closure 3. Wing nuts 7 co-acting with the upper ends of the rods 5 provide means for clamping the barrel 1, base plate 2, and closure 3 together. These wing nuts can be removed when it is desired to remove the closure 3 for the purpose of filling the compressor. A band 7' surrounds the cylinder 1, and each of the rods 5 is connected with the band 7' by means of a rivet 7''. This construction holds the upper ends of the rods 5, which are preferably three in number, in proper position to register with the apertures in the lugs 6, when the closure 3 is replaced.

A nut 8 is rotatably mounted in the closure 3. A ratchet wheel 9 encircles the nut 8 and is secured thereto by means of the screw 10. A threaded piston rod 11 extends through the nut 8, and projects into the cylinder 1. A piston 12 is carried by the inner end of the piston rod 11, and secured thereto by means of a pin 13, or in any other suitable fashion.

Projecting upwardly from the base plate 2 is a hollow boss 14, the inner end of which is secured to the metal tube 15, which extends upwardly through the piston 12 and the closure 3. This tube forms the high pressure cylinder of my compressor. A duct 16 formed in the base plate 2 provides a communicaion between the low pressure cylinder 1, and the high pressure cylinder 15, this duct forming the inlet of the high pressure cylinder. A gravity-operated check valve 17 prevents return flow through the duct 16. A screw 18 projecting through the wall of the boss 14 provides a stop for limiting the upward movement of the check valve 17.

A second duct 19 formed in the base also communicates with the hollow boss 14 and forms the outlet of the high pressure cylinder. If desired, a flexible conduit 20 may be provided for conveying the lubricant to any desired point. Preferably, the flexible conduit 20 is provided at its free end with a coupling member 21, forming a part of a well-known system of high pressure lubrication, and by means of which my compressor can be connected with the nipples or fittings secured to the bearings of the mechanism to be lubricated. The base plate 2 is also provided with an extension 22, upon which the operator can place his foot to anchor the compressor during its operation.

The plunger 23 is reciprocably mounted in the high pressure cylinder 15, and a lever 24 is pivotally mounted at a point intermediate its ends to the upper end of the plunger 23. A link 25 has its lower end pivotally secured to lugs 26 projecting from the closure 3, and its upper end pivotally connected with the inner end of the lever 24, which is bifurcated as indicated in the drawing to pass around the threaded piston rod 11. A pawl 27, one end of which co-acts with the ratchet wheel 9, has its other end pivotally connected with the link 25 intermediate the ends of this link.

In operating my improved compressor after the barrel 1 has been partially filled with lubricant, and the piston 12 and closure 3 replaced, the operator grasps the outer end of the lever 24, places his foot upon the extension 22, and lifts upwardly upon the lever 24. This movement causes the plunger 23 to move upwardly, and at the same time causes the upper end of the link 25 to move toward the threaded piston rod 11. This movement of the link 25 causes the pawl 27 to rotate the ratchet wheel 9 through a certain arc. This movement of the ratchet wheel 9 is communicated to the threaded piston rod 11 through the nut 8, and causes the piston 12 to move downwardly, thereby forcing lubricant through the duct 16, past the check valve 17, into the high pressure cylinder. The operator then forces the handle 24 downwardly, whereupon the check valve 17 closes and the lubricant in the high pressure cylinder is discharged through the duct 19, and discharge conduit 20. At the same time, the pawl 27 is retracted so as to be in position to again advance the ratchet wheel 9, and consequently the piston 12, upon the succeeding upward movement of the lever 24.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor comprising a low pressure cylinder, one end of which is closed by a base plate and the other end of which is provided with a removable closure, a nut rotatably mounted in said removable closure, a ratchet wheel secured to said nut, a screw-threaded piston rod projecting through said nut and into said low pressure cylinder, a piston carried by the inner end of said piston rod, a hollow boss projecting inwardly from said base plate and communicating with the interior of said low pressure cylinder to form an outlet therefor, and, a check valve controlling the communication, a tube secured to the inner end of said hollow boss and extending through said piston and said removable closure, said tube forming a high pressure cylinder, a plunger mounted in said high pressure cylinder, a lever pivoted intermediate its ends to the outer end of said plunger, a link pivotally connecting one end of said lever with said removable closure, and a pawl, one end of which is pivoted to said link intermediate the ends of said link and the other end of which co-acts with said ratchet wheel.

2. A lubricant compressor comprising a low pressure cylinder, one end of which is closed by a base plate and the other end of which is provided with a removable closure, a nut rotatably mounted in said removable closure, a ratchet wheel secured to said nut, a screw threaded piston rod projecting through said nut and into said low pressure cylinder, a piston carried by the inner end of said piston rod, a tube communicating with said low pressure cylinder, said tube forming a high pressure cylinder, a plunger mounted in said high pressure cylinder, an outlet duct leading from said high pressure cylinder, a lever pivoted intermediate its ends to the outer end of said plunger, a link pivotally connecting one end of said lever with said removable closure, and a pawl, one end of which is pivoted to said link intermediate the ends of said link and the other end of which co-acts with said ratchet wheel.

3. A lubricant compressor comprising a low pressure cylinder, one end of which is closed by a base plate and the other end of which is provided with a removable closure, a nut rotatably mounted in said removable closure, a ratchet wheel secured to said nut, a screw threaded piston rod projecting through said nut and into said low pressure cylinder, a piston carried by the inner end of said piston rod, a tube communicating with said low pressure cylinder, said tube forming a high pressure cylinder, a reciprocating plunger mounted in said high pressure cylinder, a lever for actuating said piston rod and for reciprocating said plunger, and operative connections between said lever, said rod and said plunger.

4. A lubricant compressor comprising a low pressure cylinder, one end of which is closed by a base plate and the other end of which is provided with a removable closure, a nut rotatably mounted in said removable closure, a ratchet wheel secured to said nut, a screw-threaded piston rod projecting through said nut and into said low pressure cylinder, a piston carried by the inner end of said piston rod, said base plate having an inlet and an outlet duct formed therein, said inlet duct communicating with the interior of said low pressure cylinder, a check valve for closing said inlet duct, a tube communicating with said inlet and outlet ducts, said tube forming a high pressure cylinder, a plunger mounted in said high pressure cylinder, a lever, a link pivotally connecting one end of said lever with said removable closure, a pawl, one end of which is pivoted to said link intermediate the ends of said link, and the other end of which co-acts with said ratchet wheel, and a connection between said lever and plunger at a point spaced from said link.

5. A lubricant compressor comprising a low pressure cylinder, one end of which is closed by a base plate and the other end of which is provided with a removable closure, a piston rod projecting through said removable closure and into said low pressure cylinder, a piston carried by the inner end of said piston rod, a hollow boss projecting inwardly from said base plate and communicating with the interior of said low pressure cylinder through a duct formed in said base plate, a check valve closing said duct, a tube secured to the inner end of said hollow boss and extending through said piston and said removable closure, said tube forming a high pressure cylinder, a plunger mounted in said high pressure cylinder, and means including a lever for actuating said piston rod to move said piston toward said base plate, and for reciprocating said plunger.

6. A lubricant compressor comprising a low pressure cylinder, a base plate for closing one end of said low pressure cylinder and a removable closure for the other end of said low pressure cylinder, a piston slidably mounted in said cylinder, a hollow boss projecting inwardly from said base plate, a tubular member secured to said hollow boss and projecting outwardly through said piston and said removable closure, said tubular member forming a high pressure cylinder, the said base plate being provided with two ducts communicating with said hollow boss, one of said ducts forming an inlet for said high pressure cylinder and the other of said ducts forming an outlet therefor, a check valve for said inlet duct, a plunger reciprocably mounted in said high pressure cylinder, and means including a lever for actuating said piston and said plunger.

7. A lubricant compressor comprising a low pressure cylinder, a base plate for closing one end of said low pressure cylinder, and a closure for the other end of said low pressure cylinder, a piston slidably mounted in said cylinder, a high pressure cylinder communicating with said low pressure cylinder, a plunger reciprocably mounted in said high pressure cylinder, and means including a lever pivotally mounted on said plunger for alternately actuating said piston and said plunger to expel lubricant from said compressor.

8. A lubricant compressor comprising a low pressure cylinder, a high pressure cylinder communicating therewith, a lubricant expelling member in each of said cylinders, and means including a lever pivotally connected with one of said expelling members for alternately actuating said expelling members.

9. Lubricating means comprising an oscillatory manual actuating element, low pressure and high pressure compressing means, a check valved conduit for delivering material from said low pressure means to said high pressure means, and power transmission means for actuating said low pressure means by movement of said element in one direction and said high pressure means by movement thereof in the other direction, said transmission means including a separable connection to said low pressure means.

10. A lubricating means comprising an oscillatory manual actuating element, low pressure and high pressure compressing means, a check valved conduit for delivering material from said low pressure means to said high pressure means, and power transmission means for actuating both said high and low pressure means by movement of said element in one direction and only said high pressure means by movement thereof in the other direction.

11. Lubricating means comprising an oscillatory manual actuating lever, low pressure compressing means, high pressure compressing means fed by said low pressure means, and power transmission means for actuating said low pressure means by an upward movement of said lever and said high pressure means by a downward movement thereof, said transmission means including a separable connection to said low pressure means.

12. Lubricating means comprising an oscillatory manual actuating lever, low pressure and high pressure compressing means, a check valved conduit for delivering material from said low pressure means to said high pressure means, and power transmission means for actuating one pressure means by an upward movement of said lever and the other pressure means by a downward movement thereof, said transmission means including a separable connection to said low pressure means.

13. Lubricating means comprising an oscillatory manual actuating lever, low pressure and high pressure compressing means, a check valved conduit for delivering material from said low pressure means to said high pressure means, and power transmission means for actuating both pressure means by an upward movement of said lever and only the high pressure means by a downward movement thereof.

In witness whereof, I hereunto subscribe my name this 13th day of March, 1922.

HARRY E. HAWKINS.